United States Patent Office 3,022,139
Patented Feb. 20, 1962

3,022,139
PREPARATION OF DIBORANE
Charles C. Clark, Kenmore, and Frank A. Kanda and Aden J. King, Syracuse, N.Y., assignors, by mesne assignments, to Olin Mathieson Chemical Corporation, a corporation of Virginia
No Drawing. Filed Mar. 16, 1956, Ser. No. 571,879
8 Claims. (Cl. 23—204)

This invention relates to the preparation of boron hydrides and, more particularly, provides a method for the production of diborane and related volatile and non-volatile boron hydrides.

The boron hydrides do not occur in nature but many of them have successfully been prepared. Diborane, tetraborane, two pentaboranes and decaborane are among the better known boron hydrides. Some of these materials and their organic derivatives are useful as fuels due to their high heats of oxidation. Diborane is useful for conversion to the higher boron hydrides and has been used to produce thin films of pure elementary boron by thermal decomposition of the hydrides on a hot surface. Diborane and other hydrides are also useful for the synthesis of metal borohydrides and metal borides. The boron hydrides are extremely powerful reducing agents. They react with Lewis bases such as ammonia, amines and pyridine and are thus useful starting materials for the preparation of boron-nitrogen compounds, for example, borazin, $B_3N_3H_6$ and many other compounds.

The process of the present invention comprises the process of heating a reduced form of boron admixed with a metallic oxide or water in an atmosphere of hydrogen suitably at atmospheric pressure.

Elementary boron is the preferred reduced form of boron used in the present process but metal borides are eminently suitable and the boron carbides can also be used. Suitable metallic oxides for use in the present process include magnesium oxide, zinc oxide, alumina, thoria, and zirconia.

An intimate mixture of the solid reactants is prepared by mixing the finely powdered components. Preferably the mixture is compressed into homogeneous pellets or slugs, and preferably in the mixture there is at least sufficient of the reduced form of boron to react stoichiometrically with the oxygen of the oxide to form boron sub-oxide, BO, so that the number of gram atoms of boron present in the reduced form of boron is at least equal to the number of gram atoms of oxygen present in the water or metallic oxide. Thus, when zirconia is used as the oxide the stoichiometric requirement according to the equation:

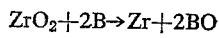

$$ZrO_2 + 2B \rightarrow Zr + 2BO$$

is two gram atoms of boron to one gram mole of zirconia. Preferably the ratio of the number of gram atoms of boron present in the reduced form of boron to the number of gram atoms of oxygen present in the water or metallic oxide is within the range 1:1 to 10:1, although ratios above and below the range are useful, for example 0.5 and 20. The equations are not necessarily intended to suggest intermediate or reaction mechanisms but are used for calculation only. The actual reactions require hydrogen as a reactant and produce boron hydrides as products.

In addition to the reduced form of boron and the metallic oxide or water, hydrogen gas is supplied to the reaction. It requires no special purification. Commercial hydrogen as supplied in cylinders under pressure is satisfactory.

The reaction is carried out by heating a suitable mixture of the boron or boron compound with water or metallic oxide to a temperature of 850–1500° C. in an atmosphere of hydrogen. The necessary heat can be supplied in any suitable manner. A particularly advantageous method is by electrical induction. For this purpose an electrically conductive material is provided to support or surround the reaction mixture and is arranged for the introduction of hydrogen gas and removal of the gaseous products. A vertical graphite tube of suitable diameter, water-jacketed at one end and arranged to support the reaction mixture at the other, has been utilized satisfactorily. The graphite tube is surrounded by a fused silica jacket which, in turn, is jacketed and water-cooled. Hydrogen gas is introduced into the water cooled end of the graphite tube, contacting the reaction mixture and then passing into an ordinary glass system for collection of the products. The outer jacket is surrounded by the turns of an induction coil, suitably supplied with high-frequency current.

The diborane product is separated from unreacted hydrogen and other products of the reaction suitably by condensation at low temperatures. The residual hydrogen is suitable for recycle to the reaction zone.

The principal gaseous product of the reaction is diborane but small proportions of other boron hydrides may be obtained under some conditions as liquids or solids. These are readily removed in a cool zone before condensing the diborane product from the gas.

Example I

A Vycor (fused silica) tube about 1¼ inches in diameter and 8 inches long was arranged vertically with an exit at the top for the gaseous products of the reaction. Inserted into the fused silica tube from the bottom was a graphite cylinder ending about 2 inches below the top of the fused silica tube and extending below it. The graphite cylinder had an external diameter of about ¾ inch and an internal diameter of about ½ inch and a wall thickness of ⅛ inch. It was retained in place by a stopper at the bottom and the extended part of the graphite carried a brass water cooling jacket. A tantalum plate about 2 inches below the top of the graphite cylinder and arranged inside the graphite cylinder supported the solid mixture charged to the reaction. The silica tube was surrounded by a water jacket. At the level of the tantalum liner the water jacket was surrounded by an induction heater comprising several turns of heavy copper tubing about ¼ inch in external diameter and cooled internally by a stream of water. The resistance heater was supplied by a high frequency current. The tantalum support was charged with five grams of a pelletized mixture of elementary boron and zirconium oxide ($ZrO_2$) in a molar ratio of 2:1. The mixture was heated at a temperature of 1200° C. while a stream of hydrogen amounting to about 2 liters per minute was passed through the apparatus. The exit gases were burned in air. (In operating the process cyclically, the hydrogen is recycled through the reaction chamber by means of a pump.) The intense green color of the flame showed that gaseous boron hydrides were formed. One of the boron hydrides was diborane.

Example II

Two grams of a pelletized mixture of elementary boron and magnesium oxide in a molar ratio of 4:1 was heated in an atmosphere of hydrogen in the apparatus of Example I at a temperature of 1000° C., the hydrogen rate being about 2 liters per minute. Diborane was formed, and identified by infra-red spectra.

Example III

Two grams of a pelletized mixture of elementary boron and alumina ($Al_2O_3$) in a molar ratio of 10:1 was heated to 1000° C. in a stream of hydrogen as described in Example I. Diborane was formed and identified by infrared spectra.

Example IV

Three grams of a pelletized mixture of elementary boron and thorium oxide ($ThO_2$) in a molar ratio of 10:1 was heated in a stream of hydrogen as described in Example I, at a temperature of 1200° C. Diborane was formed.

Example V

Two grams of elementary boron was heated to a temperature of 1200° C. in the apparatus of Example I. The hydrogen introduced (about 2 liters per minute) to the reaction chamber was first bubbled through water maintained at a temperature of about 60–70° C. Diborane was formed.

Example VI

Two grams of a mixture of boron and magnesium boride ($MgB_4$) was heated at a temperature of 1200° C. as described in Example I. The molar ratio of $MgB_4$:B was 1:1. The hydrigen introduced was first passed through water maintained at a temperature of 60–70° C.; diborane was formed.

We claim:

1. A method for the preparation of diborane which comprises reacting a reduced form of boron selected from the group consisting of elemental boron, metal borides and boron carbides with an oxide selected from the group consisting of water vapor, magnesia, alumina, thoria and zirconia in a hydrogen atmosphere at a temperature of from 850° C. to 1500° C. and recovering diborane from the reaction mixture.

2. The method of claim 1 wherein the ratio of the number of gram atoms of boron present in the reduced form of boron to the number of gram atoms of oxygen present in said oxide is within the range 1:1 to 10:1.

3. The method of claim 1 wherein said reduced form of boron is elementary boron and wherein said oxide is zirconium oxide.

4. The method of claim 1 wherein said reduced form of boron is elementary boron and wherein said oxide is magnesium oxide.

5. The method of claim 1 wherein said reduced form of boron is elementary boron and wherein said oxide is alumina.

6. The method of claim 1 wherein said reduced form of boron is elementary boron and wherein said oxide is thorium oxide.

7. The method of claim 1 wherein said reduced form of boron is elementary boron and wherein said oxide is water vapor.

8. The method of claim 1 wherein said reduced form of boron is a mixture of elementary boron and magnesium boride and wherein said oxide is water vapor.

References Cited in the file of this patent

Stock: "Hydrides of Boron and Silicon," pages 38–44, 1933, Cornell Univ. Press.

Zintl et al.: "Zeitschrift für Anorganische und Allgemeine Chemie," vol. 245, pages 8–11 (1940).

Moeller: "Inorganic Chemistry," pages 409–410, John Wiley and Sons, New York.